United States Patent Office 3,282,064
Patented Nov. 1, 1966

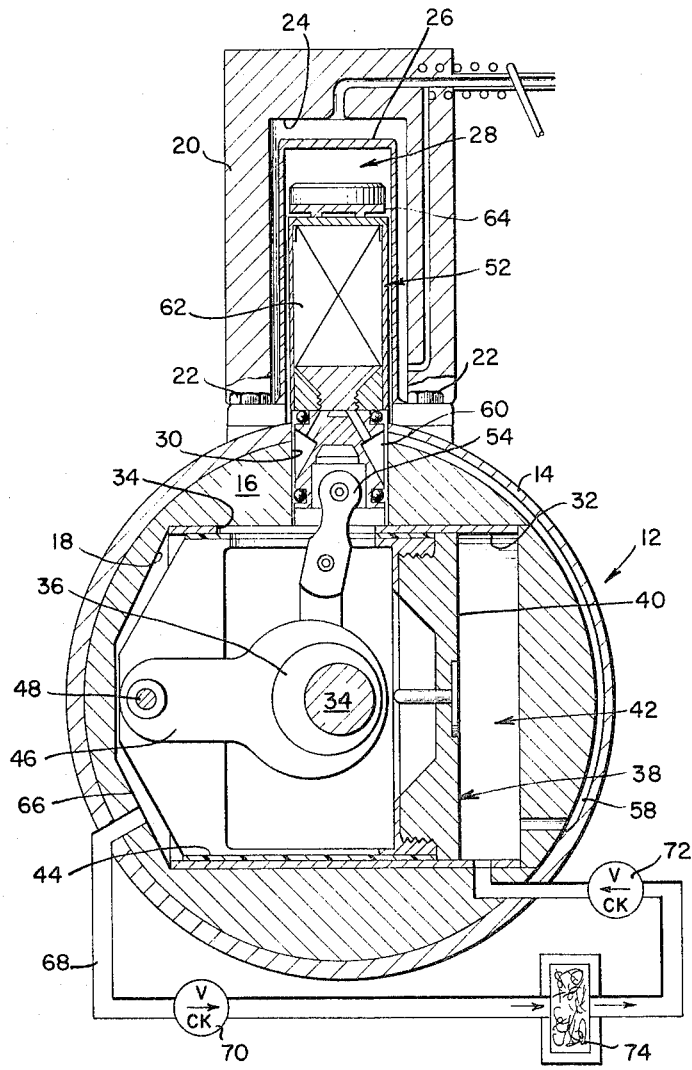
Kenneth W. Cowans,
John B. Glode,
INVENTORS.
ATTORNEY.

3,282,064
REFRIGERANT REGENERATION AND PURIFICATION AS APPLIED TO CRYOGENIC CLOSED-CYCLE SYSTEMS
Kenneth W. Cowans, Los Angeles, and John B. Glode, Santa Monica, Calif., assignors to Hughes Aircraft Company, Culver City, Calif., a corporation of Delaware
Filed June 29, 1965, Ser. No. 467,846
12 Claims. (Cl. 62—45)

The invention relates to cryogenic refrigerant regeneration and purification for use in closed-cycle systems and has particular application to such closed-cycle systems commonly known as the Stirling or Ericsson cycles.

In recent years, an important need has developed in the field of electronic technology for refrigerating equipment having the capability of creating low temperatures in the range of 75° Kelvin or lower. For example, the performance of some infrared detectors and parametric amplifiers is substantially enhanced when operated in extremely low ambient temperatures. In such applications, design work in recent years has emphasized closed-cycle refrigeration systems because they offer the inherent advantages of flexibility, operational simplicity and relatively easy maintenance. An example of one such closed-cycle refrigerator is disclosed in my copending U.S. patent application, Serial No. 426,174, filed January 18, 1965. Attention is directed to that disclosure to typically illustrate the structure and operation of the type devices hereunder consideration.

Many recently developed applications of closed-cycle refrigerators require that the equipment be operated over long periods of time. In many of these applications it has been found that refrigeration efficiency has progressively deteriorated resulting in an inability of the equipment to maintain optimum temperature at the load situs. A practical result is that the related detector or amplifier performance is substantially impaired. It has been discovered that reduction in refrigeration efficiency frequently is caused by a partial blockage of the refrigerant as it moves within the closed circuit. This partial blockage can be due to contaminants freezing in the passageways of the equipment that define the closed circuit.

Accordingly, it is a general object of the invention to provide a closed-cycle refrigerator directed to the maintenance of high operating efficiency over extended operating periods.

It is another general object of the invention to achieve said long term efficient operation by maintaining optimum refrigerant purity within the closed circuit.

It is yet a further object of the invention to achieve refrigerant compensation and cleaning in automatic response to pressure differential levels developed within the equipment during normal operation thereof. Thus the invention provides for the ingress of additional refrigerating fluid into the circuit to compensate for accidental leakage thereof and concurrently provides means for continuous elimination of contaminants during refrigerator operation.

It is still another object of the invention to provide a filter arrangement particularly adapted to the absorption of contaminants encountered in the operation of the type of equipment here under consideration. Specifically, the disclosed invention utilizes filtering material effective to absorb all contaminating material that may exist in the system in vapor form, such as oil vapor, carbon dioxide, water vapor, etc.

It is yet another object of the invention to provide a valving arrangement in operative association with the filter structure employed to substantially reduce pressure pulsation impingement on the filtering material and thereby reduce any adverse effect such pressure variation may have on the said material.

There and other objects of the invention will be more particularly understood in the course of the following description and from an examination of the related drawing, wherein:

The sole figure is a fragmentary, vertical, transverse, cross-sectional view of a typical closed circuit refrigerator employing the invention.

Describing the invention in detail and directing attention to the drawing, the numeral 12 generally indicates a typical embodiment of a miniature refrigerator employing a Stirling type closed-loop cycle. It is again noted that the drawing is fragmentary in nature and specific details of a typical refrigerator construction may be found in the heretofore referenced U.S. patent application. The particular refrigerator illustrated has been found to produce refrigeration at about 70° K. when employing a refrigerant such as helium gas at about 150 p.s.i.a. The numeral 14 denotes a generally cylindrical hollow outer housing. Disposed within the housing 14 is a bulkhead 16 having a generally transverse cylinder or bore 18 formed therein. A secondary housing 20 is appropriately secured, via conventional cap screws 22, 22 to the housing 14. Internally thereof the housing 20 defines a secondary chamber 24 forming a segment of a secondary refrigerating loop which is not, per se, related to the present disclosure. Within the chamber 24 a second bore or cylinder 26 is disposed, defining therewithin an expansion chamber 28. The chamber 28 is in communication with the bore 18 via passage 30 contained within housing 14 and bulkhead 16. Disposed within the bore 18 is an annular sleeve 32. It will be noted that sleeve 32 is provided with an aperture 34 to establish communication with the heretofore mentioned passage 30.

A compact folded piston array in which the respective pistons operate along intersecting axes and in a 90° phase relation with one another, are disposed within chamber 28 and bore 18. A crankshaft 34 extends longitudinally of the housing 12 and is in appropriate driving power train engagement with a conventional power source such as an electric motor (not shown). It will be understood that the crankshaft 34, in operation, eccentrically rotates a crank 36 and in a clockwise direction for the production of refrigeration in expansion chamber 28. A relatively large piston 38 is disposed within the sleeve 32 and has a forward surface 40, which defines, with the sleeve and bore 18, a compression chamber 42. If desired, the piston 38 may be annularly provided with a segment of low-friction material, as at 44, to offer substantially friction-free piston movement. A connecting rod 46 operatively associated with the eccentric 36 is pivotally connected as at 48 to the piston 38. Patently, rotation of the shaft 34 induces reciprocation of piston 38.

Directing attention to the cylinder 26, the contained expansion chamber 28 has disposed therein a secondary or relatively small piston indicated generally at 52. A second connecting rod 54 is operatively associated, at opposed ends thereof, with the crankshaft 34 and piston 52. The connecting rod 54, being disposed within passage 30, is operative to induce vertical reciprocating motion of the piston 52 in response to rotation of the crankshaft 34.

Very briefly, the operation of the arrangement is as follows: As the crankshaft 34 rotates from the illustrated position, the chamber 42 is progressively reduced in volume and chamber 28 is also reduced in volume. As a result of the volumetric decrease in both chambers, refrigerant contained within the refrigerator undergoes a compression phase and a pressure rise until the piston 52 moves upwardly beyond top dead center. Thereafter, a relatively constant pressure phase is developed as the piston 52 moves downwardly increasing the volume of the chamber 28. During this portion of the cycle the piston 38 continues movement in a direction to decrease the volume of the chamber 42. As a result, refrigerant flows from the chamber 42 to the chamber 28 via a communicating path or passage 58, inlet port 60 and through the piston 52 by passage through a thermal regenerator 62 and out of slots or apertures 64. Movements of the refrigerant through the regenerator 62 results in a transfer of heat thereto as the refrigerant flows into chamber 28. The respective paths and passages define, with chambers 42 and 28, a closed circuit primary work volume.

A refrigerant expansion phase is initiated as the large diameter piston 38 passes top dead center which results in the gradual increase in volume of the chamber 42. As this occurs, the volume of chamber 28 is continuing to increase, which results in a total increase in working volume within the closed circuit inducing an over-all pressure drop within the primary work volume. As a result of this expansion phase, the temperature of the refrigerant within the chamber 28 is substantially lowered and it is this refrigerating effect which may be utilized in the before-mentioned applications.

As the piston 38 moves toward bottom dead center, the piston 52 leaves the bottom dead center position and begins its upward travel. A second relatively constant pressure phase is thus initiated and the refrigerant within the chamber 28 is transferred to the chamber 42 by a reversal of flow through the mentioned work volume. Eventually, the piston 38 reaches the bottom dead center position illustrated in the figure and the above-described refrigeration cycle may be re-initiated.

As is well understood, reasonable production requirements, as well as minor structural errors in manufacture and assembly, prevent totally leak-free operation of the described piston array. Thus it can reasonably be expected, especially in the compression phases described, that a certain volume of the refrigerant will bypass the pistons 38 and 52 and leak into the bore 18 on the crankcase side of the piston 38. This aspect of the bore 18 will hereinafter be referred to as the crankcase volume or chamber 66.

A particular feature of the disclosed invention is that a passage 68 establishes communication between the crankcase volume 66 and the compression chamber 42 of the working volume heretofore described. The passage 68 and related structure is here shown schematically but it is to be understood that it may be incorporated within the structure in any suitable manner.

The passage 68 has incorporated therein one-way check valves 70 and 72. It will be noted by reference to the drawing that the check valves 70 and 72 permit flow only from the crankcase volume 66 to the working volume 42. Interposed in operative series between the valves 70 and 72, and within the line 68, is a filtering device 74. In the preferred form of the invention, the filtering material utilized within the device 74 is of the absorbent variety, one such material being granulated activated charcoal. It is the purpose of the filter 74 to remove from the flowing refrigerating gas all foreign matter or contaminants entrained in the gas that exist therein in a gaseous, solid or liquid state above the critical temperature of the refrigerating liquid under normal operating conditions.

In normal operation, the maximum pressure that will develop within chamber 66 is below the minimum developed pressure in working chamber 42 at any time during the operating cycle. As a result of refrigerant leakage or piston blow-by, the rated maximum pressure, on occasion, and within the crankcase chamber 66, may increase above the minimum pressure developed in the working chamber 42. When this differential pressure condition exists, the check valves 70 and 72 open and permit the refrigerant, within the crankcase chamber 66, to flow, via passage 68, to the chamber 42. In effect, the chamber 66 acts as a storage chamber to contain a supply of regenerating refrigerant. The result is to bring the refrigerant within the closed circuit to optimum volumetric level. During this passage or transfer, the refrigerant is filtered at the device 74 and the filter material thereof absorbs all oil vapor, water vapor, or other contaminants that may be carried in the flowing gas stream. It will be apparent that over an extended period of operation virtually every discrete portion of the refrigerant within the closed circuit will be subject to the mentioned leakage or blow-by, and, as a result of the transfer from the crankcase chamber or volume 66 to the chamber 42, all of the refrigerating fluid will at some time be subject to filtration. It will thus be apparent that during such extended periods of operation virtually all contaminants will be removed from the equipment.

Check valve 72 serves the added function of preventing high pressure variations developed within the chamber 42 from impinging on the filter 74 thus preventing any adverse effect such pressure fluctuation may have on the structure of the filtering material. Check valve 70 accommodates the transfer of the maximum pressure level existent within the crankcase chamber 66 to the filter 74, upon refrigerant transfer, and thereafter prevents the dissipation of that pressure level within the filter 74 to the crankcase chamber 66 regardless of any subsequent decrease in pressure level within the crankcase chamber during equipment operation. Thus, the check valve 70 is effective to minimize pressure pulsation from the crankcase chamber on the filtering material and thus maintain the filtering action at a high level of efficiency.

It will be apparent that the disclosed invention is operative to maintain refrigerant volume within the closed circuit at an optimum level and assures the virtual complete removal of any contaminants within the refrigerating fluid. Thus the refrigerating efficiency of the arrangement is maintained even over periods of extended operation.

The invention as disclosed is by way of illustration and not limitation and may be modified in its various aspects and yet fall within the scope of the appended claims.

What is claimed is:
1. In a closed-cycle refrigerator employing a refrigerating fluid,
a closed housing defining a first cylinder and a second cylinder,
said cylinders having longitudinal axes in angular relato to each other,
movable pistons disposed in the cylinders and defining therewith a work volume comprising compression and expansion chambers,
said work volume including passage means interconnecting the chambers,
a rotatable crankshaft operatively connected to the respective pistons to induce reciprocation thereof in a predetermined phase relationship between the pistons whereby refrigerating fluid is sequentially transferred between the chambers, said housing further defining a crankcase volume communicating with the cylinders and on the sides of the respective pistons remote from said chambers,
other passage means establishing one-way communication between the crankcase volume and the work volume, said other passage means accommodating transfer of refrigerating fluid from the crankcase volume to the work volume upon creation of a differential pressure between the volumes.
2. A closed-cycle refrigerator according to claim 1,
and including filter means disposed in series relation in the other passage means and operative to cleanse the fluid moving therethrough.
3. A closed-cycle refrigerator according to claim 2,
wherein said other passage means include one-way check valve means disposed in series relation therein and on opposed sides of said filter means.
4. A closed-cycle refrigerator according to claim 3, wherein said pistons reciprocate in an approximate 90° phase relation to each other.

5. In a closed-cycle cryogenic refrigerator adapted for miniaturization and having a hermetically sealed housing internally defining a work volume and a crankcase volume, said work volume including a compression chamber and an expansion chamber and heat exchange passage means interconnecting the chambers, refrigerating fluid disposed in at least said work volume;

the combination comprising a rotatable crankshaft operatively disposed in the crankcase volume,
a large diameter piston movably disposed in the compression chamber,
a smaller diameter piston movably disposed in the expansion chamber,
connecting rod means eccentrically carried by the crankshaft and connected to the respective pistons to induce reciprocation thereof upon crankshaft rotation whereby said refrigerating fluid is transferred back and forth between the chambers and said heat exchange passage means,
said crankcase volume communicating with the chambers to receive therefrom fluid leakage bypassing said pistons during reciprocation thereof,
conduit means establishing communication between the volumes.
and means disposed in said conduit means accommodating the flow and filtration of said fluid from the crankcase volume to the work volume and operative to maintain the fluid in the work volume as a substantially optimum volumetric level and in a clean condition therein.

6. A closed-cycle cryogenic refrigerator according to claim 5,
wherein said fluid flow from the crankcase volume to the work volume occurs when the pressure level within the crankcase volume exceeds the pressure level in the work volume.

7. A closed-cycle cryogenic refrigerator according to claim 6,
wherein said conduit means interconnects the crankcase volume and the compression chamber.

8. A closed-cycle cryogenic refrigerator according to claim 7,
wherein said disposed means includes one-way check valve means operative to prevent fluid flow from the work volume to the crankcase volume through said conduit means.

9. A closed cycle cryogenic refrigerator according to claim 8,
wherein said disposed means include a molecular sieve type filter,
said check valve means comprising a plurality of check valves on opposed sides of said filter and in operative series relation therewith within said conduit means.

10. In a closed-cycle cryogenic refrigerator of the miniature type and having a housing internally defining a work volume comprising a compression chamber and an expansion chamber, said work volume including heat exchange passage means interconnecting the chambers, refrigerating fluid disposed in said work volume;
the combination comprising a large diameter piston movably disposed in the compression chamber,
a smaller diameter piston movably disposed in the expansion chamber,
means connected to the respective pistons to induce reciprocation thereof in the respective chambers and in predetermined phase relation to each other, the reciprocation of said pistons being operative to induce the sequential transfer of said fluid between said chambers,
a storage chamber communicating with said first mentioned chambers and arranged to receive therefrom fluid leakage by-passing said pistons during reciprocation of the latter,
conduit means establishing communication between the storage chamber and the work volume,
and means disposed in series relation within said conduit means to accommodate one-directional flow from said storage chamber to said work volume of said fluid in said storage chamber upon the existence of a determined pressure differential between the storage chamber and the work volume,
said last mentioned means including filter means operative to cleanse fluid flowing through said conduit means.

11. In a closed-cycle cryogenic refrigerator of the miniature type and having a housing internally defining a work volume comprising a compression chamber and an expansion chamber, said work volume including heat exchange passage means interconnecting the chambers, refregrating fluid disposed in said work volume;
the combination comprising a first piston movably disposed in the compression chamber,
a second piston movably disposed in the expansion chamber,
means connected to the respective pistons to induce reciprocation thereof in the respective chambers and in predetermined phase relation to each other, the reciprocation of said pistons being operative to induce the sequential transfer of said fluid between said chambers,
a storage chamber communicating with said first-mentioned chambers and arranged to receive therefrom fluid leakage by-passing said pistons during reciprocation of the latter,
conduit means establishing communication between the storage chamber and the work volume,
and means disposed in series relation within said conduit means to accommodate one-directional flow from said storage chamber to said work volume of said fluid in said storage chamber upon the existence of a determined pressure differential between the storage chamber and the work volume,
said last mentioned means including filter means operative to cleanse fluid flowing through said conduit means.

12. A closed-cycle cryogenic refrigerator according to claim 10,
wherein said conduit means establishes communication between said storage chamber and said compression chamber,
said filter means comprising a filter of the molecular sieve type,
one-way check valve means disposed in series relation within said conduit means and on opposed sides of said filter,
said pistons being arranged for reciprocation in an approximate 90° phase relationship to each other.

References Cited by the Examiner

UNITED STATES PATENTS

| | | | |
|---|---|---|---|
| 3,036,440 | 5/1962 | Feinman | 62—64 |
| 3,069,865 | 12/1962 | Morrison | 62—64 |
| 3,182,462 | 5/1965 | Long et al. | 62—55 |
| 3,195,322 | 7/1965 | London | 62—514 X |

LLOYD L. KING, *Primary Examiner.*